(12) United States Patent
Jang et al.

(10) Patent No.: US 8,299,773 B2
(45) Date of Patent: Oct. 30, 2012

(54) SYSTEM AND METHOD FOR LIMITING INPUT-CURRENT SURGE IN A SWITCHING MODE POWER SUPPLY

(75) Inventors: Yungtaek Jang, Cary, NC (US); Milan M. Jovanovic, Cary, NC (US); Yi-Hsin Leu, Chungli Industrial Zone (TW); Ming-Tsung Hsieh, Chungli Industrial Zone (TW); Wei-Hsin Wen, Chungli Industrial Zone (TW); Chi-Hsing Huang, Chungli Industrial Zone (TW)

(73) Assignee: Delta Electronics, Inc., Taipei (TW)

( * ) Notice: Subject to any disclaimer, the term of this patent is extended or adjusted under 35 U.S.C. 154(b) by 585 days.

(21) Appl. No.: 12/501,031

(22) Filed: Jul. 10, 2009

(65) Prior Publication Data

US 2011/0006748 A1 Jan. 13, 2011

(51) Int. Cl.
G05F 5/00 (2006.01)
G05F 1/00 (2006.01)
(52) U.S. Cl. ........................................ 323/299; 323/222
(58) Field of Classification Search .................. 323/222, 323/282, 299, 266, 224, 901; 363/89, 98, 363/125, 53, 49, 44; 361/93, 111
See application file for complete search history.

(56) References Cited

U.S. PATENT DOCUMENTS

| | | | |
|---|---|---|---|
| 3,529,210 A | 9/1970 | Ito at al. | |
| 4,631,470 A | 12/1986 | Bingley | |
| 4,716,511 A | 12/1987 | Masaki | |
| 4,769,752 A | 9/1988 | Rackowe | |
| 4,864,482 A | 9/1989 | Quazi et al. | |
| 5,122,724 A | 6/1992 | Criss | |
| 5,742,151 A * | 4/1998 | Hwang | 323/222 |
| 5,930,130 A * | 7/1999 | Katyl et al. | 323/222 |
| 6,320,357 B1 * | 11/2001 | Peters et al. | 323/222 |
| 6,445,165 B1 | 9/2002 | Malik et al. | |
| 6,714,429 B2 | 3/2004 | Phadke | |
| 6,737,845 B2 * | 5/2004 | Hwang | 323/222 |
| 6,831,447 B1 * | 12/2004 | Wittenberg | 323/222 |
| 7,095,215 B2 * | 8/2006 | Liu et al. | 323/299 |

\* cited by examiner

*Primary Examiner* — Jue Zhang
(74) *Attorney, Agent, or Firm* — Venable LLP; Robert S. Babayi; Christopher Ma

(57) ABSTRACT

A power supply comprises an input voltage detector that detects a drop in input voltage that corresponds to an input voltage loss. A power converter is coupled to the input voltage detector. The power converter, which may be a boost converter or a power factor correction converter, has a switching device that is actuated in accordance with a duty cycle. A duty cycle adjuster is responsive to detection of the drop in the input voltage to adjust the duty cycle of the switching device in order to limit an input current surge through the switching device below a desired level after the input voltage returns.

20 Claims, 24 Drawing Sheets

SYSTEM AND METHOD FOR LIMITING INPUT-CURRENT SURGE IN A SWITCHING MODE POWER SUPPLY

FIELD OF THE INVENTION

This invention relates to the method and circuits that limit the magnitude of the surge current that flows through the input of a power converter when an input power source is reenergized.

DESCRIPTION OF THE PRIOR ART

The majority of today's data processing equipment require power supplies that are capable of maintaining there output voltages within the specified range for a given time period after a loss of the input power source. The required energy to support the output power during this time is obtained from a properly sized energy-storage capacitor. However, because of a relatively large value of the energy-storage capacitor, the initial charging current of the energy-storage capacitor after the input power source is applied first time and/or reapplied after a power source loss can be very large. Generally, if the magnitude of the peak of this inrush current is not limited below the rating of the components in the input circuit, the excessive inrush current leads to a power supply failure.

Generally, the inrush current can be limited by placing a current-limiting device in series with the energy-storage capacitor. The most notable examples of the inrush-current-limiting implementations were shown in FIGS. 1 and 2. In the implementation in FIG. 1, inrush-current limiting is done by resistor $R_{LIM}$ placed between the power source and the energy capacitor, whereas in FIG. 2, the inrush-current limiting is achieved by connecting resistor $R_{LIM}$ directly in series with the energy-storage capacitor. The major difference between the implementations in FIGS. 1 and 2 is in the magnitude of the current flowing through the current-limiting resistor. In the implementation in FIG. 1, the current-limiting resistor is placed in the power-processing path, i.e., in series between the source and load so that the current flowing through the resister is equal to the source current. Since this current is proportional to the power delivered to the load, the current through the resistor and, therefore, its power dissipation can be significant in high-power applications. In the implementation shown in FIG. 2, the current-limiting resistor is not placed in the power-processing path but it is effectively connected in parallel to the load so that only the ac component of the load current flows through the current-limiting resistor. As a result, the power dissipation of the resistor in FIG. 2 is much smaller than that of the implementation in FIG. 1 because this ac component is typically much smaller compared to the source current. Moreover, in switch-mode power converters, the ripple current through the energy-storage capacitor is almost independent of the load power.

Generally, in high power applications the inrush-current limiting resistor in both implementations is bypassed by low-impedance switch $S_{BYP}$ to further reduce power dissipation in current-limiting resistor $R_{LIM}$ after the inrush-current period is over, as shown in FIGS. 1 and 2. This controllable switch, which is turned on after the inrush-current period is finished and which is selected so that its impedance (resistance) in the on-state is much smaller than the resistance of the inrush-current limiting resistor, can be either a mechanical relay, or a Silicon Controlled Rectifier (SRC), or a Metal-Oxide Semiconductor Field-Effect Transistor (MOSFET), or an IGBT (Insulated Gate Bipolar Transistor), or any other suitable controllable switch.

A desirable inrush-current limiting circuit has to be able to ensure a proper inrush-current limiting during all possible start-up scenarios such as, the cold startup, hot startup, and power line disturbance conditions. Generally, this requires a proper sequencing of the turn-on and turn-off instances of the inrush-current-resistor bypass switch and the turn-on and turn-off instances of the power converter. This sequencing is especially important during input-voltage disturbance conditions where the input voltage is reapplied to the converter after a brief loss period. To illustrate timing requirements of the inrush-current control circuit, FIG. 3 shows the boost power-factor-correction (PFC) converter that is typically used as the front-end in off-line ac/dc power supplies. In this circuit, resistor $R_{LIM}$ in series with energy-storage capacitor $C_B$ is employed to limit the inrush current. For this circuit to operate properly during line disturbance conditions, it is necessary to turn-off the PFC stage (by turning off boost PFC switch $S_B$) before turning off bypass switch $S_{BYP}$ after an line-voltage failure is detected and to turn-on switch $S_{BYP}$ before switch $S_{PFC}$ after the line voltage has recovered, as illustrated in FIG. 4.

For example, U.S. Pat. No. 6,714,429 to Phadke discloses an inrush-current control circuit that limits the inrush current during cold and hot startups, as well as during power line disturbance conditions by providing the describe proper turn-on and turn-off sequencing of the PFC converter and the bypass switch. It is essential for this inrush-current control circuit implementation that the bypass switch across the inrush-current limiting resistor is turned on only when the reapplied line voltage is lower than the voltage across the energy-storage capacitor. As a result, this implementation requires sensing of the line and energy-storage-capacitor voltage difference to determine the appropriate turn-on moment of the bypass switch.

While the proper turn-on and turn-off sequencing of the power converter and the bypass switch is a necessary requirement for controlling the inrush current caused by the charging of the energy-storage cap, in the boost PFC front end this it is not sufficient to guarantee that the line current does not exceed the specified inrush-current limit after the line voltage is reapplied following a brief loss period. Namely, the proper sequencing only ensures that the current charging the energy-storage capacitor is kept below the specified limit, but does not prevent a line-current surge following the moment the boost converter is turned on. As illustrated in FIG. 5, the energy-storage-capacitor charging path while the boost converter is turned off (i.e., boost switch $S_B$ is kept off) is through boost inductor $L_B$ and boost rectifier $D_B$, whereas after the boost converter is turned on (boost switch $S_B$ is being modulated) following a line-voltage recovery, the line-current surge path is through boost inductor $L_B$ and boost switch $S_B$. Generally, even with the proper sequencing, it may happen that during a power line disturbance energy-storage-capacitor (bulk cap) voltage $V_B$ is lower than or equal to input (line) voltage $v_{IN}$ when boost switch $S_B$ starts switching, as shown in FIG. 6. Under this condition, boost switch $S_B$ starts switching with the maximum duty cycle, which is typically in the 95% range because the PFC controller will try to increase voltage $V_B$ to the set level which is above the peak of the line voltage. With such a high duty cycle of switch $S_B$ the current through boost inductor $L_B$ will increase well beyond its steady-state value. Moreover, this high current will decrease the inductance value of inductor $L_B$ and in the worst-case scenario even saturate the inductor, which will further increase the peak current in inductor $L_B$. Since input (line) current $i_{IN}$ is the filtered inductor current, the surge in the inductor current is seen as a surge in the input current $i_{IN}$, as illustrated in the plot in FIG. 6. If this surge current is not controlled, it may exceed the specified inrush-current limit.

It should be noted that typical boost PFC converter implementations employ a series-connected diode and resistor between the input and output, as shown with dashed lines in FIG. 3. The function of this diode-resistor combination is to prevent the saturation of boost inductor $L_B$ by providing a direct charging path from the input to the bulk capacitor during transients (start-up, power line disturbances, load-induced transients, etc) where the bulk-capacitor voltage becomes lower than the input voltage. However, the described surge-current issue is present regardless if this diode-resistance combination is employed or not.

Therefore, there exists a need for a system and method for controlling the input surge current in power converters during input voltage disturbances that avoids the above described disadvantages.

SUMMARY OF THE INVENTION

Briefly, according to the present invention, a power supply comprises an input voltage detector that detects a drop in input voltage, e.g., the line voltage, that corresponds to an input voltage loss. A power converter, which may be a boost converter or a power factor correction (PFC) converter, is coupled to the input voltage detector and incorporates a switching device that is actuated in accordance with a duty cycle. A duty cycle adjuster is responsive to detecting the drop in the input voltage upon the input voltage loss to adjust the duty cycle of the switching device in order to limit an input current surge through the switching device below a desired level after the input voltage returns.

According to some of the more detailed features of the invention, the duty cycle adjuster comprises a reset circuit that resets the duty cycle to a substantially zero value from a value that ranges from substantially zero to substantially one. The duty cycle is then gradually increased from the substantially zero value to a value that regulates the power supply output based on a time constant set by a capacitor in the reset circuit.

According to other more detailed features of the present invention, an energy storage device is coupled to the power converter and a current limiting resistor limits the flow of current through the energy storage device after the input voltage returns. In one embodiment, upon detecting an input voltage loss, the power converter is turned off followed by actuating the bypass switch to limit the current through the energy storage device after the input voltage returns. The duty cycle of the power converter can be adjusted after turning off the power converter either before or after actuating the bypass switch. After the input voltage returns to the initial voltage, the bypass switch is actuated to bypass the current limiting resistor before turning on the power converter.

According to still other more detailed features of the present invention, a controller coupled to the duty cycle adjuster regulates the power supply output by controlling the duty cycle of the switching device based on voltage variations across the energy storage device after the duty cycle is adjusted, e.g., reset, according to the present invention. The controller has an error amplifier coupled to the energy storage device and a pulse width modulator (PWM) that controls the duty cycle based on a reference voltage. In one embodiment, the reference voltage is coupled to the error amplifier via the duty cycle adjuster. In another embodiment, the pulse width modulator has an input coupled to outputs of the duty cycle adjuster and error amplifier. In still another embodiment, the error amplifier has an input coupled to the reference voltage and output of the duty cycle adjuster.

A method executed in a power supply device according to the present invention detects a drop in an input voltage that corresponds to an input voltage loss and adjusts a duty cycle of a switching device in response to detecting the drop in order to limit a current surge through the switching device after the input voltage returns to the initial voltage. In one embodiment, the method turns off the power converter upon detecting the input voltage loss followed by actuating a switch that limits input surge current of the power supply. The duty cycle of the power converter can be adjusted, e.g. reset, either before or after actuating the switch. After the input voltage returns, the power converter is turned on after actuating the switch to bypass the current limiting resistor.

DETAILED DESCRIPTION OF THE INVENTION

According to one embodiment of the present invention, a power supply controls the magnitude of the input-current surge in the switching device(s) of a power converter during input-voltage disturbances such as input voltage loss when the power supply is powered by a supply voltage that may be either AC or DC input voltage. In one embodiment, the supply voltage is the line input voltage initially applied to the power supply. This initial voltage is subject to disturbances during the normal operation of the power supply. The input-current surge limiting is achieved by adjusting the duty cycle of the power converter based on a detected input voltage that indicates the input voltage is lost, for example, when the input voltage drops out. The duty cycle has a value ranging from substantially zero to substantially one. In one embodiment, the duty cycle is reset such that a substantially zero duty cycle is applied to the power converter after the input voltage returns. Thereafter, the duty cycle is gradually increased from the substantially zero value to a value that regulates the power supply output.

In an exemplary embodiment, the power supply has a boost PFC front end. Under this arrangement, upon detecting the input voltage loss, the duty cycle of the PFC controller is reset after the boost PFC front end is disabled (turned off). When the input voltage returns, the boost PFC front end is enabled (turned on) and the duty cycle of the boost switch is gradually increased from substantially zero to a steady state value which effectively controls the magnitude of the input-current surge within the switching devices of the power converter and limits it below a desired level. The invention can be applied to both analog and digital controlled boost PFC front ends and switch-mode power converters in general. The invention can be implemented as a hardware embodiment in analog controllers as well as a method in firmware of digital controllers.

Figure 1:
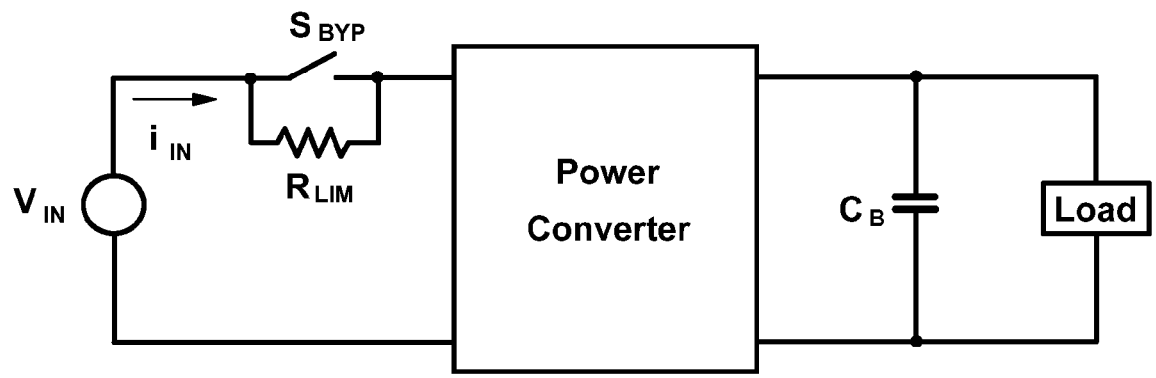
FIG. 1 shows implementation of inrush-current-limiting circuit with inrush-current-limiting resistor coupled in series with input source and energy-storage capacitor. (prior art)
Figure 2:
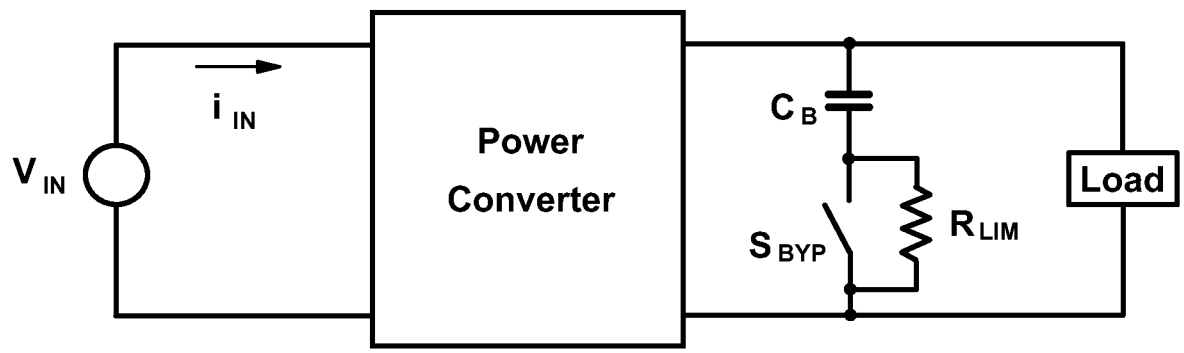
FIG. 2 shows implementation of inrush-current-limiting circuit with inrush-current-limiting resistor connected in series with energy-storage capacitor. (prior art)
Figure 3:
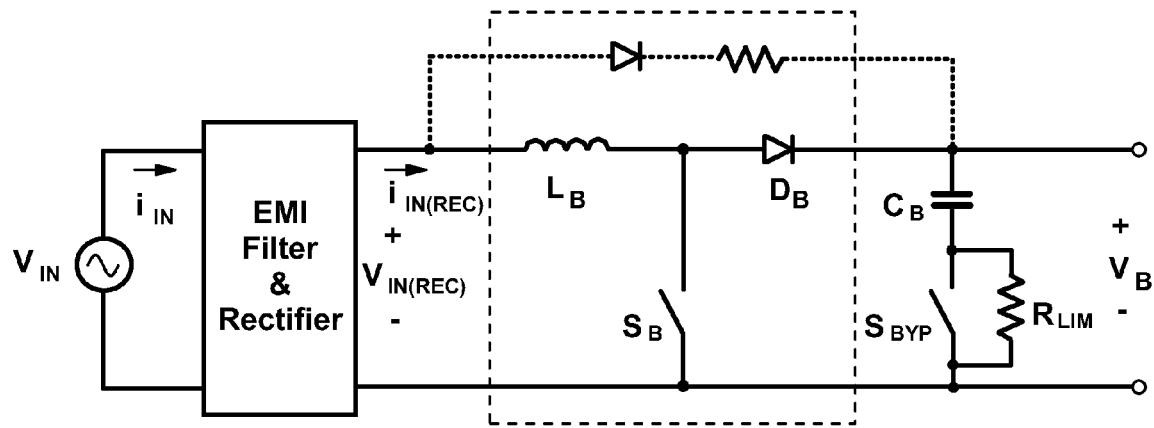
FIG. 3 shows boost PFC front end with inrush-current limiting implemented with inrush-current-limiting resistor connected in series with energy-storage capacitor. (prior art)
Figure 4:
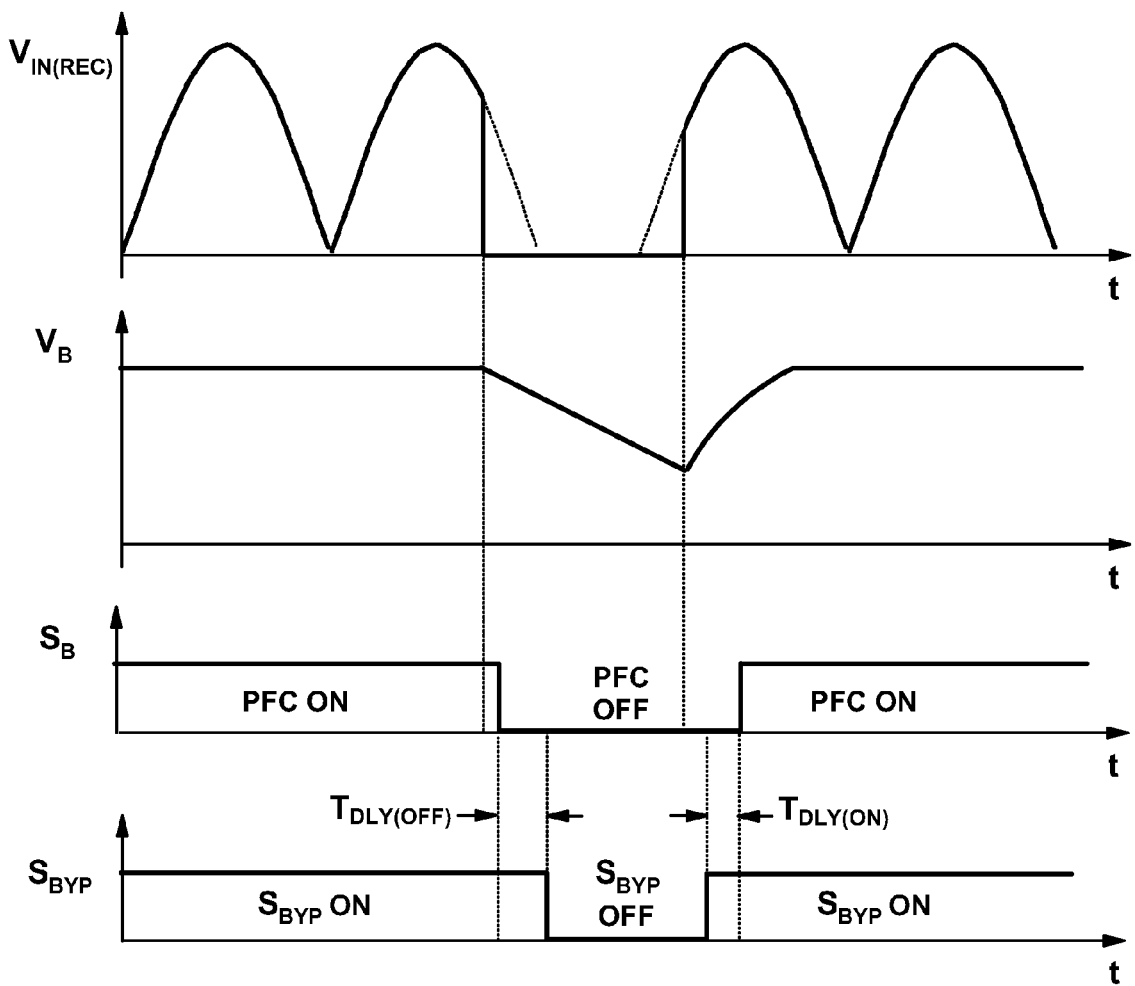
FIG. 4 illustrates control timing diagrams of switches $S_B$ and $S_{BYP}$ during power line disturbance. (prior art)
Figure 5:
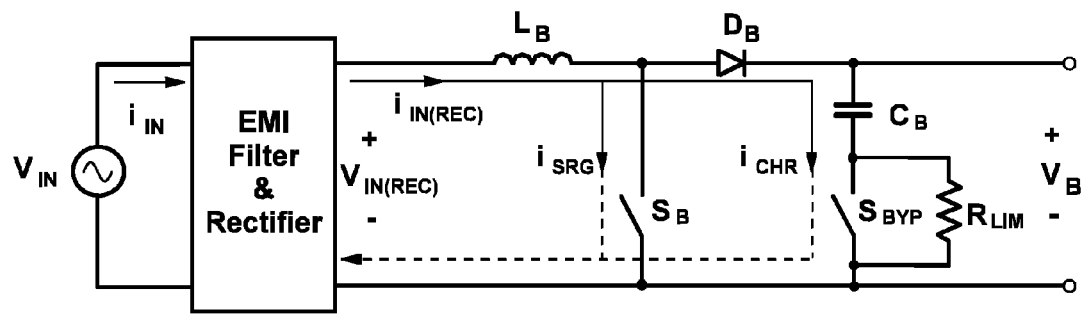
FIG. 5 illustrates energy-storage-capacitor charging-current path when boost PFC circuit is kept off by disabling switch $S_B$ and surge-current path after boost converter is enabled.
Figure 6:
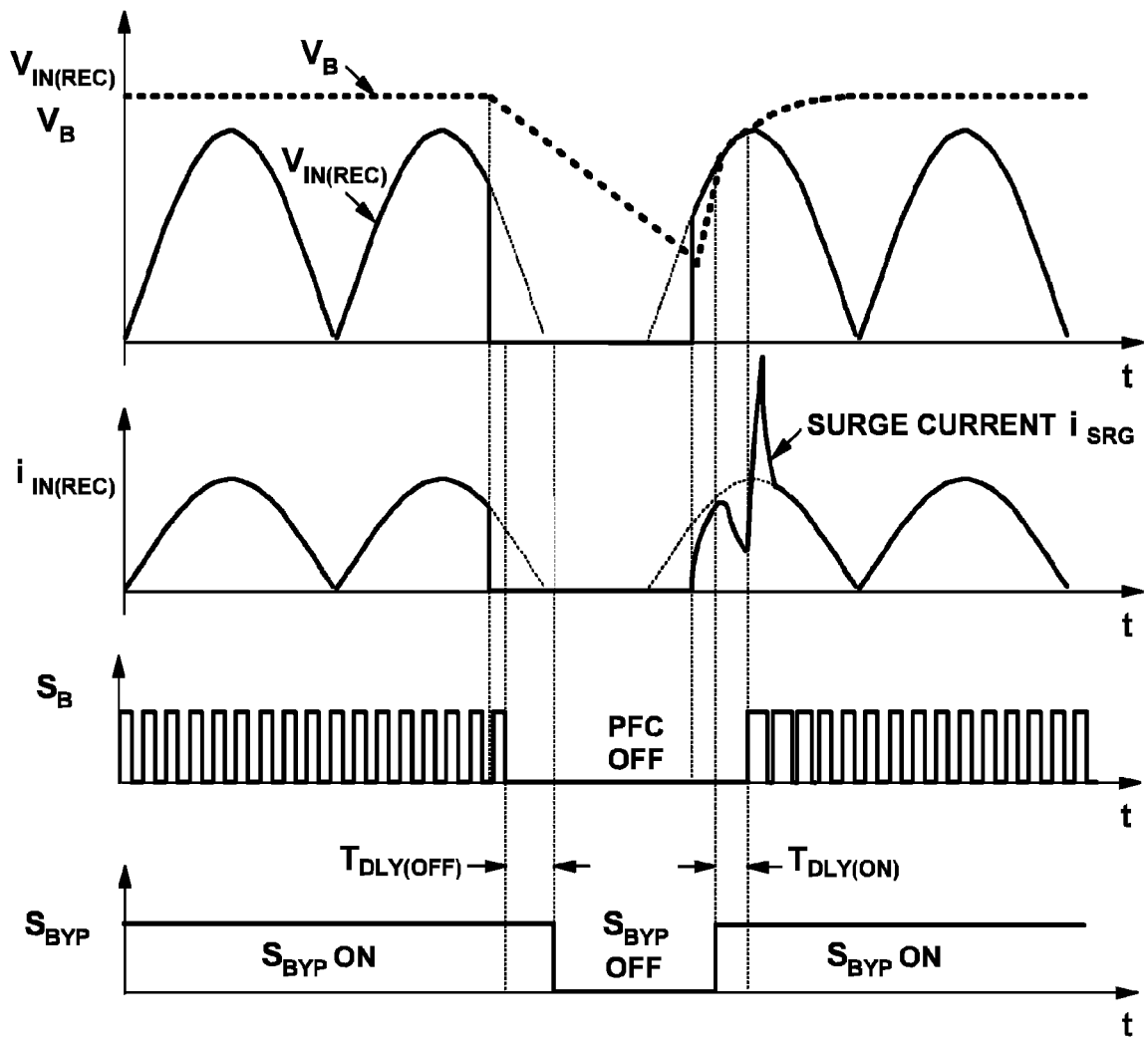
FIG. 6 illustrates inability of prior-art inrush-current-limiting methods and circuits to prevent input (line) current surge after power-line recovery.
Figure 7:
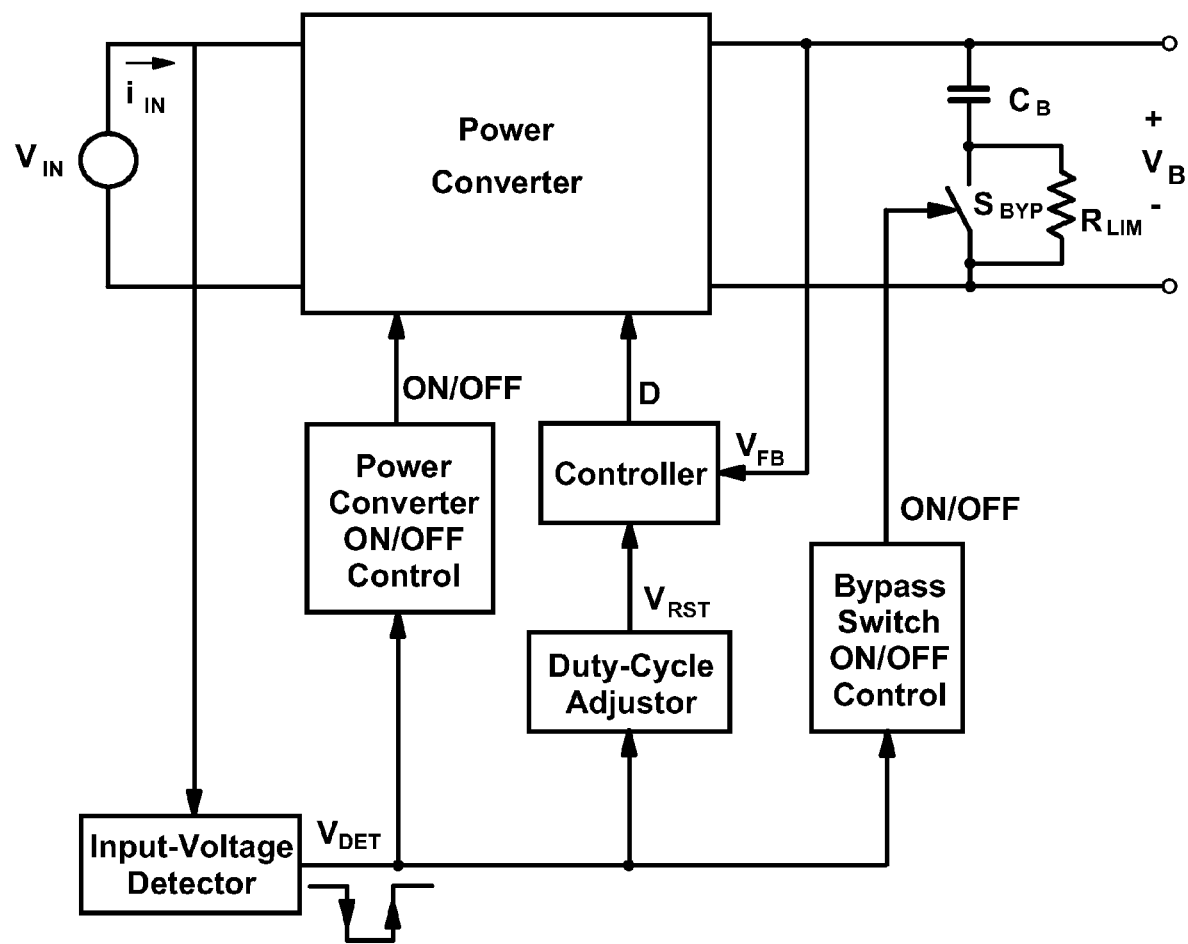
FIG. 7 show preferred embodiment of method of this invention for limiting input surge current during input voltage disturbances.

FIG. 7 shows one embodiment of the present invention implemented in hardware. The power supply shown in FIG. 7 comprises an input voltage detector having an output $V_{DET}$. The voltage detector detects a drop in input voltage, for example, from an initial voltage to a voltage below a threshold that corresponds to the input voltage loss. The power supply has a power converter with a switching device (not shown) that is actuated in accordance with a duty cycle. A duty cycle adjuster is responsive to the detection of the drop in the input voltage to adjust the duty cycle of the switching device in order to limit the input current surge through the switching device. An energy storage device, capacitor $C_B$, is coupled to the power converter, and a current limiting resistor $R_{LIM}$ limits current through the energy storage device. A bypass switch, $S_{BYP}$, across the current limiting resistor $R_{LIM}$ is actuated in response to the detection of the drop in input voltage to limit the current through the energy storage device after the input voltage returns to the initial voltage.

In this embodiment, the input voltage $V_{IN}$ is continuously monitored by the input voltage detector for disturbances that result in loss of the input voltage. Immediately after an input voltage loss is sensed, the output of the detector $V_{DET}$ changes its level. In FIG. 7, the output of the input-voltage loss circuit $V_{DET}$ goes from a high to a low state. However, it should be noted that the choice of the voltage levels at the output of this detector circuit is arbitrary, i.e., the circuit could be designed to change from low to high level after a loss of the input voltage is detected.

Figure 8:
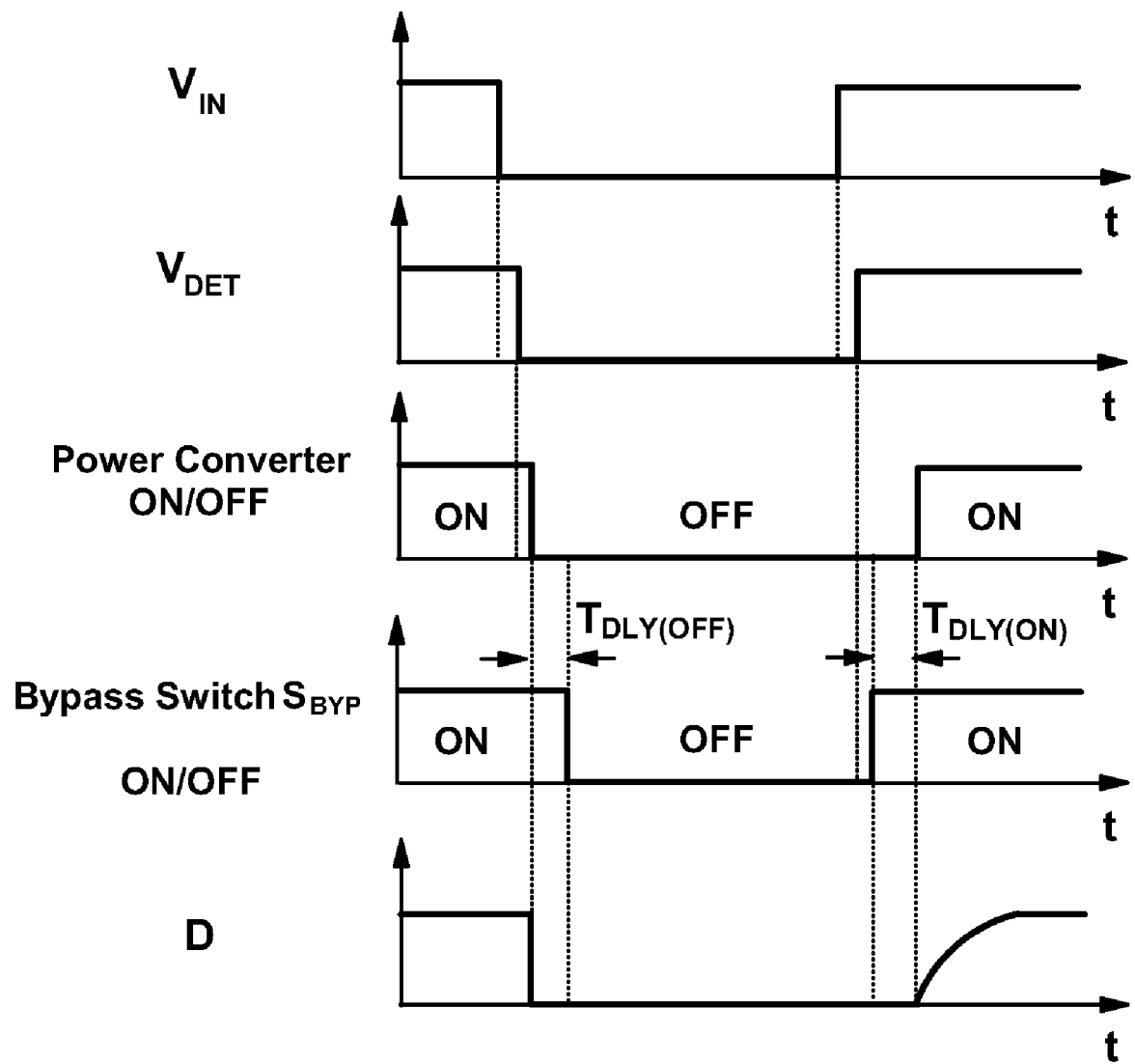
FIG. 8 illustrates timing waveforms for embodiment in FIG. 7.

Once the input voltage is lost, the changed output level of the detector triggers several events such as the shutdown of the power converter, turn-off of bypass switch $S_{BYP}$, and the adjustment of the duty cycle. These events are properly sequenced to ensure correct operation of the power supply under input-voltage disturbance conditions. FIG. 8 shows a sequence for operating the power converter according to the present invention. When the input voltage is lost, the power converter is disabled followed by opening bypass switch $S_{BYP}$ to turned it off to limit the current through the energy storage device after the input voltage returns to the initial voltage. The power converter can also be turned off prior to actuating the bypass switch. Then, the duty cycle is adjusted to limit input current surge. In one embodiment, adjusting the duty cycle comprises resetting the duty cycle to a substantially zero value. However, depending on the application the adjustment may set the duty cycle in any other value that limits the input current surge. It should be noted that turning on bypass switch $S_{BYP}$ and adjusting the duty cycle can be done in any order after the power converter is disabled. FIG. 8 illustrates the case when duty cycle D is adjusted first and then bypass switch $S_{BYP}$ is turned off.

After the input voltage is recovered and the output $V_{DEC}$ has changed back to the level corresponding to return of the input voltage to the initial voltage, i.e., the high level in FIG. 8, bypass switch $S_{BYP}$ is turned on first and the power converter is enabled (turned on). The duty cycle is then gradually increased from a substantially zero value to a value required to maintain the output regulated. Because of this gradual and controlled increase of the duty cycle, the input surge current is controlled to be limited below a desired value that avoids damaging the switching device. Then after the bypass switch is actuated to bypass the current limiting resistor before turning on the power converter. It should be noted that the delays between the detector output $V_{DET}$ level changes and the enabling/disabling of the power converter and the turn on/off of the bypass switch as shown in FIG. 8 are implemented inside the power converter on/of and bypass switch on/off blocks.

Figure 9:
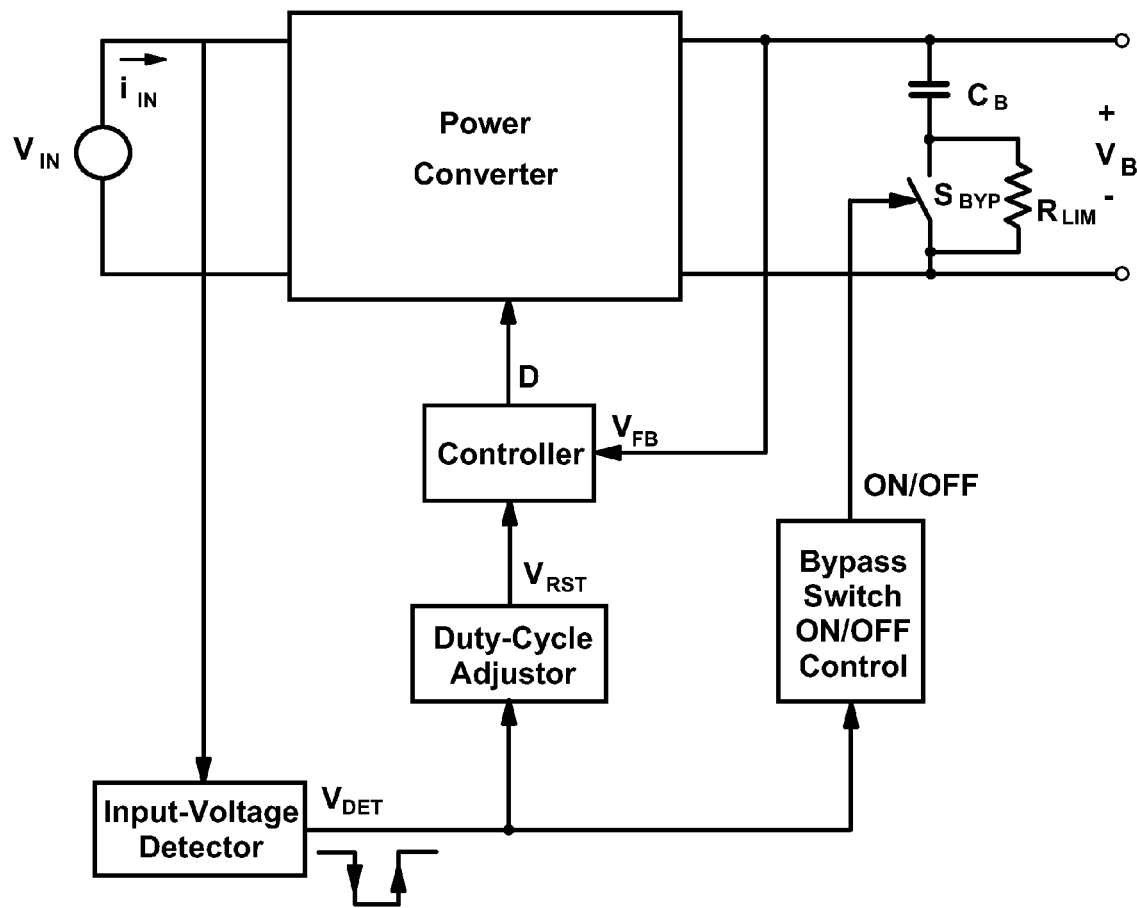
FIG. 9 show another embodiment of method of this invention for limiting input surge current during input voltage disturbances.
Figure 10:
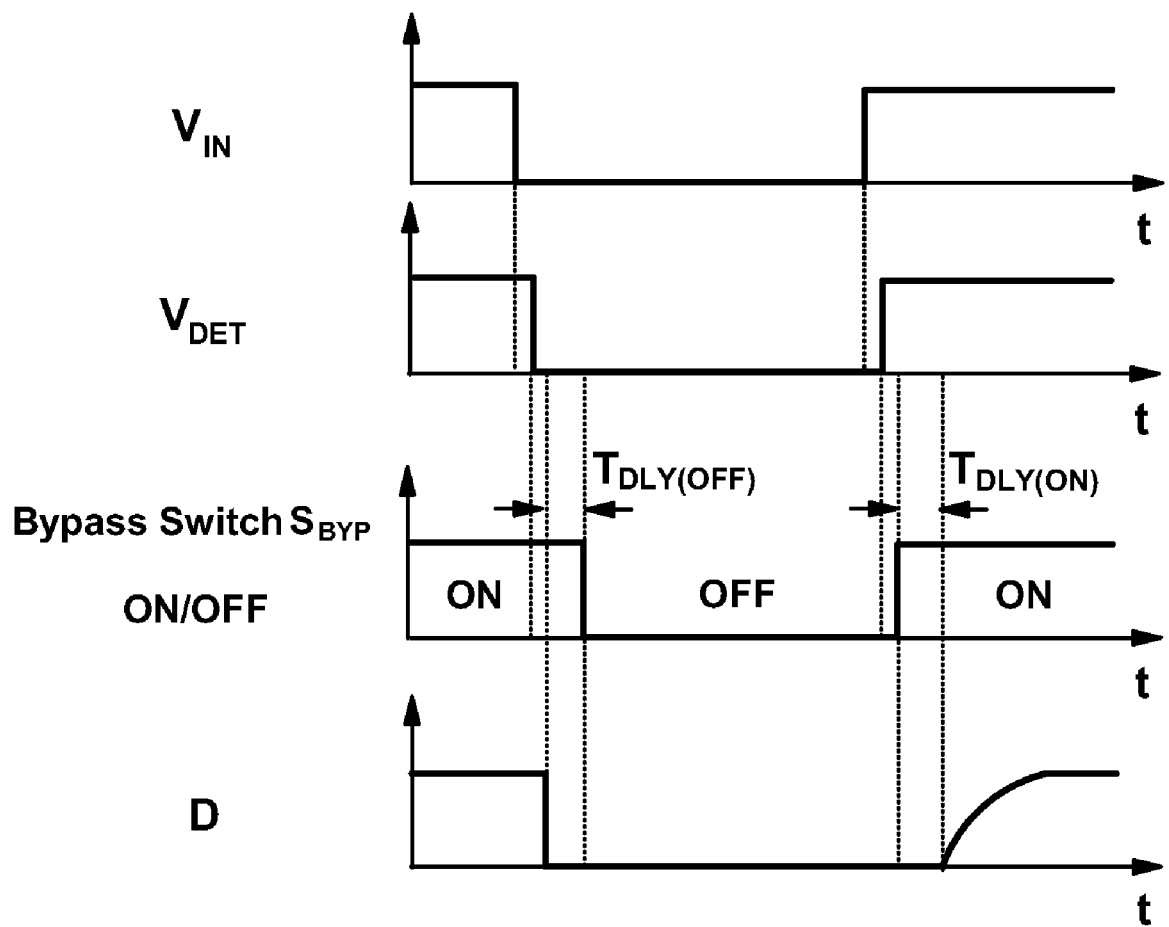
FIG. 10 illustrates timing waveforms for embodiment in FIG. 9.

FIG. 9. shows an embodiment in which function of turning off and on the power converter during input-line disturbances is performed by the duty-cycle adjuster and controller, without an extra block, which simplifies the implementation of the invention. Namely, when the duty cycle applied to the power converter is substantially zero, the power converter is turned off so there is no need for a separate circuit for enabling and disabling the power converter. In this embodiment, the bypass switch $S_{BYP}$ is turned off after the power converter is turned off and it is turned on before the power converter is enabled (turned on) following a recovery of the initial voltage, as shown in FIG. 10.

Figure 11:
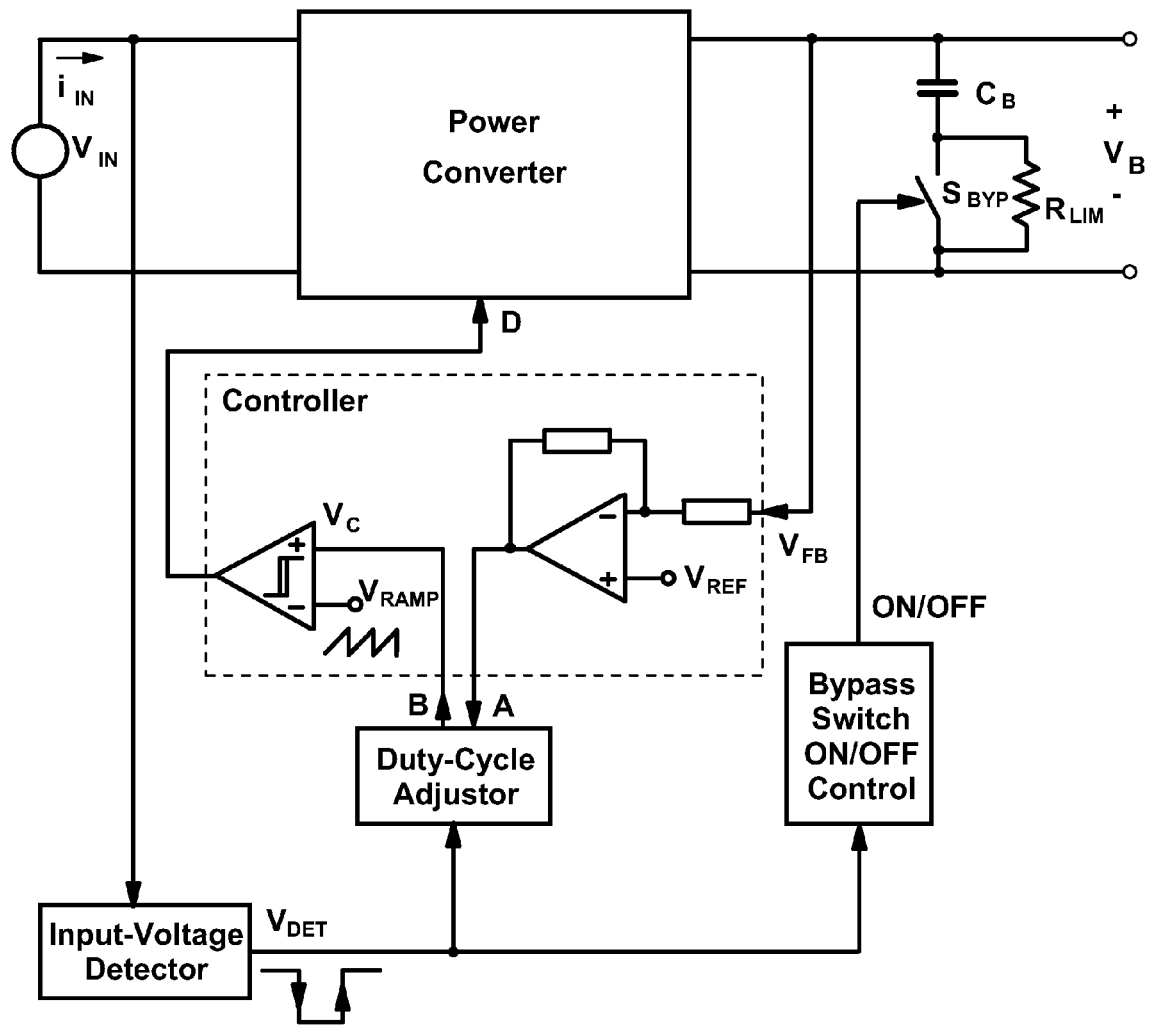
FIG. 11 shows example of implementation of method of this invention in conjunction with analog controller.

FIG. 11 shows an analog controller coupled to the duty cycle adjuster for controlling the duty cycle of the switching device based on voltage variations across the energy storage device. The controller has an error amplifier coupled to the energy storage device and a pulse width modulator (PWM) for adjusting the duty cycle based on a reference voltage. In this embodiment, the duty cycle is adjusted by forcing the control input of the PWM, i.e., the input coupled to the output of the error amplifier, to a desired level by forcing voltage $V_C$ at the non-inverting input of the PWM comparator low after the input voltage loss is detected. After the initial voltage has recovered, i.e., after output $V_{DET}$ of the input-voltage detector returns to the high level, the duty cycle is gradually increased by gradually increasing voltage $V_C$. It should be noted that since this gradual increase of the duty cycle is much faster than that during the initial start-up, the circuit used to gradually increase the duty cycle during the initial start-up cannot be used for this purpose.

Figure 12:
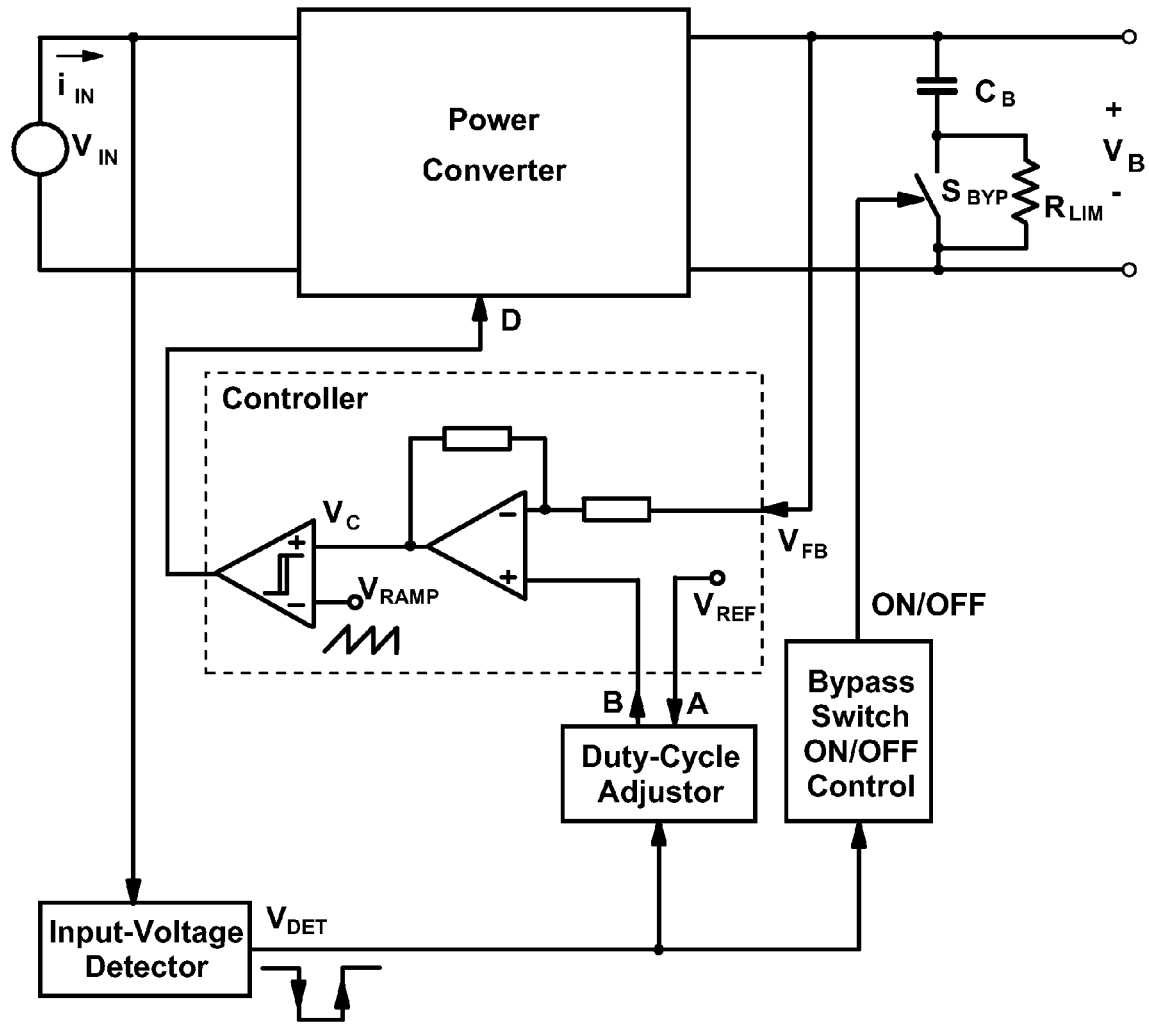
FIG. 12 shows another example of implementation of method of this invention in conjunction with analog controller.

FIG. 12 shows the reference voltage being coupled to the error amplifier via the duty cycle adjuster. In this arrangement, the duty cycle adjuster has an input coupled to a reference voltage and the PWM has an input coupled to the output of the error amplifier for controlling the duty cycle based on the output of the error amplifier. In this embodiment, the adjustment of the duty cycle is implemented by forcing the reference voltage of the error amplifier to a low voltage (zero) after the input voltage loss is detected. The reference voltage is gradually increased to the desired level after the initial voltage has recovered.

Figure 13:
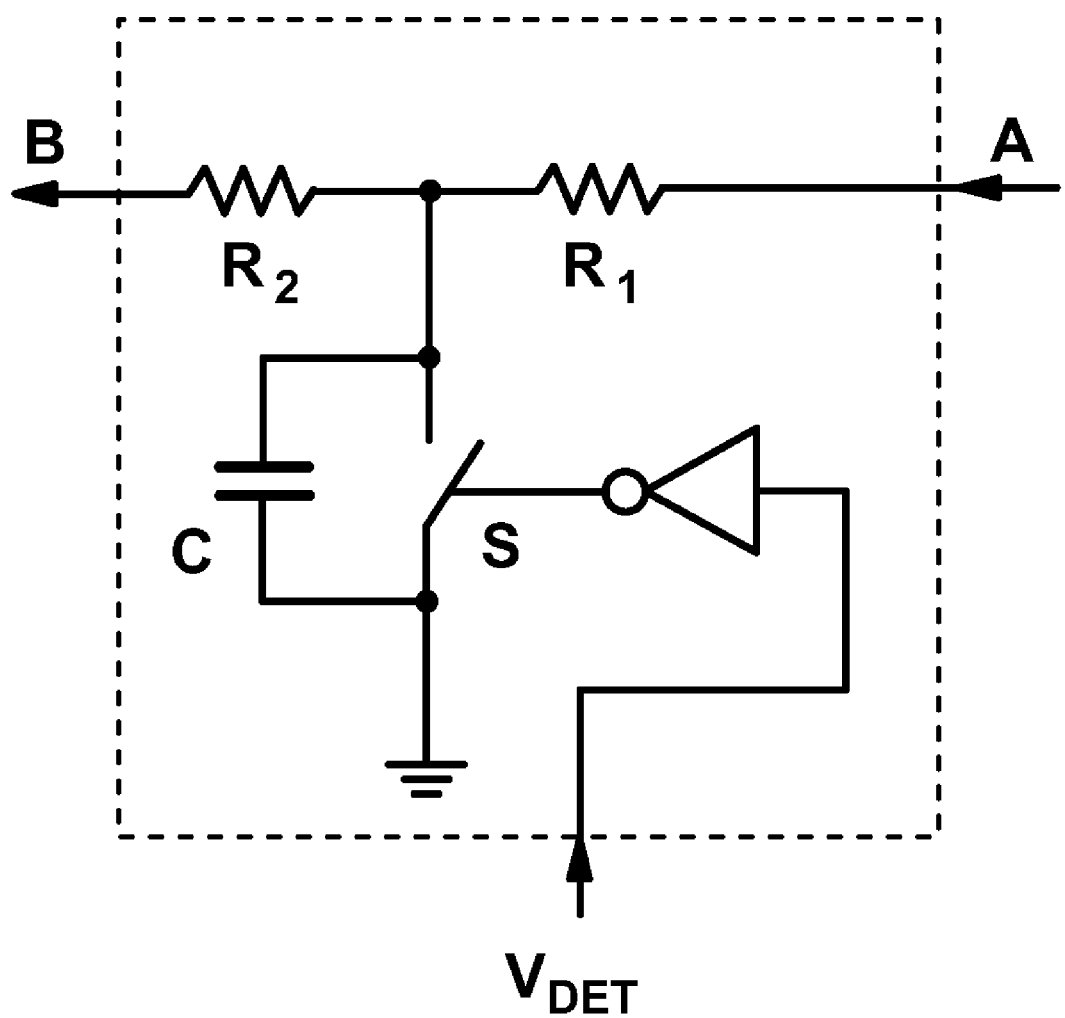
FIG. 13 shows example of duty-cycle reset method that can be used in implementations in FIGS. 11 and 12.

The duty cycle adjuster can be a duty cycle reset circuit. FIG. 13 shows the duty cycle reset circuit having an energy storage device coupled to an out put B; and a bypass switch across the energy storage device that is actuated in response to the detection of the drop in input A. When implemented in the embodiment in FIG. 11, the A input of this duty cycle reset circuit is coupled to the output of the error amplifier, whereas its B output is coupled to the non-inverting input of the PWM. When implemented in FIG. 12, the A input is coupled to the reference voltage of the feedback loop and the B output is coupled to the non-inverting input of the error amplifier. When the initial voltage is present, i.e., when $V_{DET}$ is at the high level, switch S is open and potential of output B is (approximately) equal to the potential of input A. However, when the initial voltage is lost, $V_{DET}$ goes to a low level, switch S turns on pulling output B to a low level. This transition of output B from high potential to low potential is fast because of a fast discharge of capacitor C through switch S. When $V_{DET}$ goes back to the high level following the initial voltage recovery, potential of output B starts gradually increasing with a time constant set by resistor $R_1$ and capacitor C. In some implementation, the value of resistor $R_2$ can be zero, i.e., output B is coupled to capacitor C. Thus, reset circuit comprises a capacitor that sets a time constant for gradually increasing the duty cycle after the duty cycle is reset.

Figure 14:
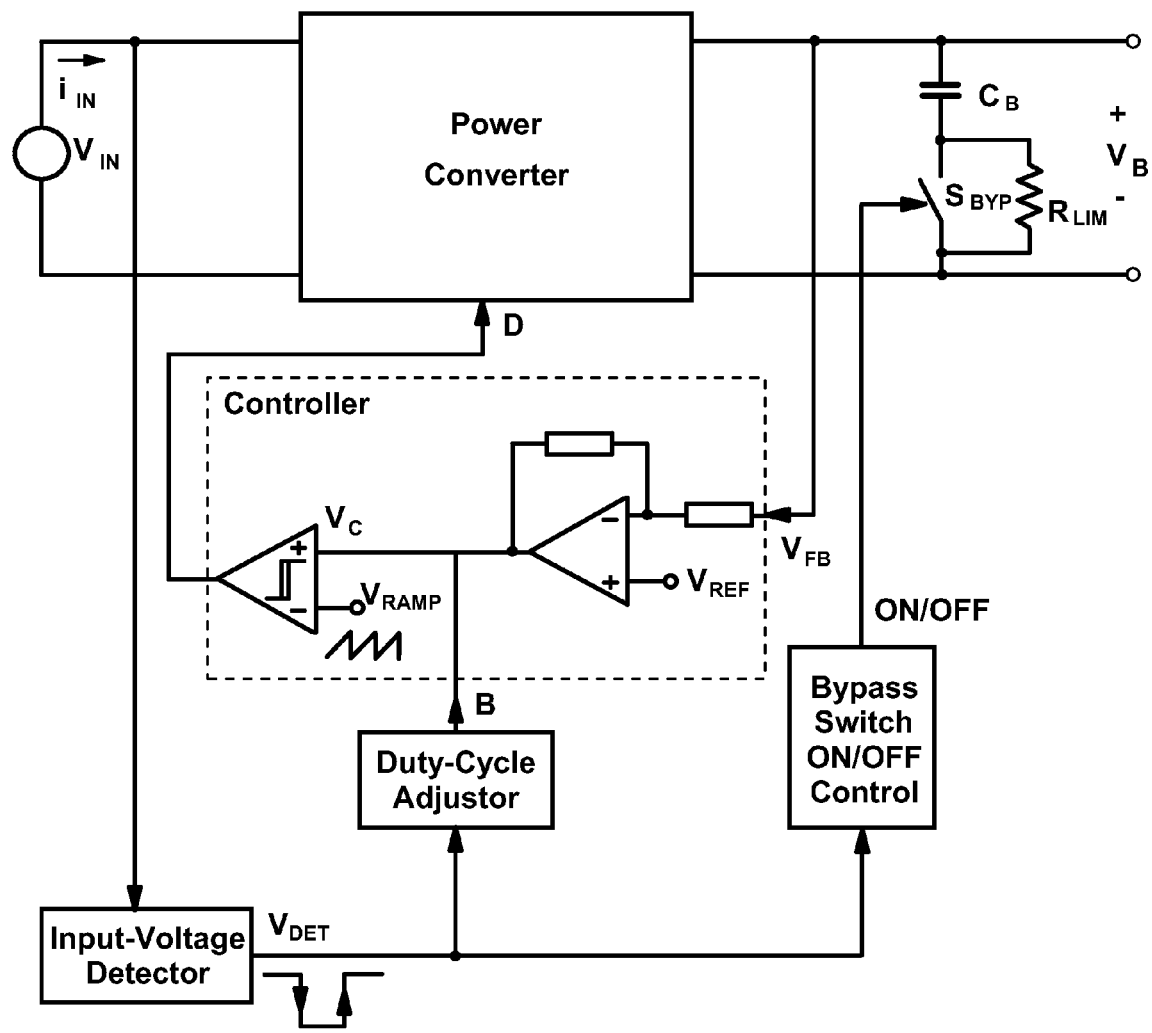
FIG. 14 shows modified implementation of method of this invention shown in FIG. 11.
Figure 15:
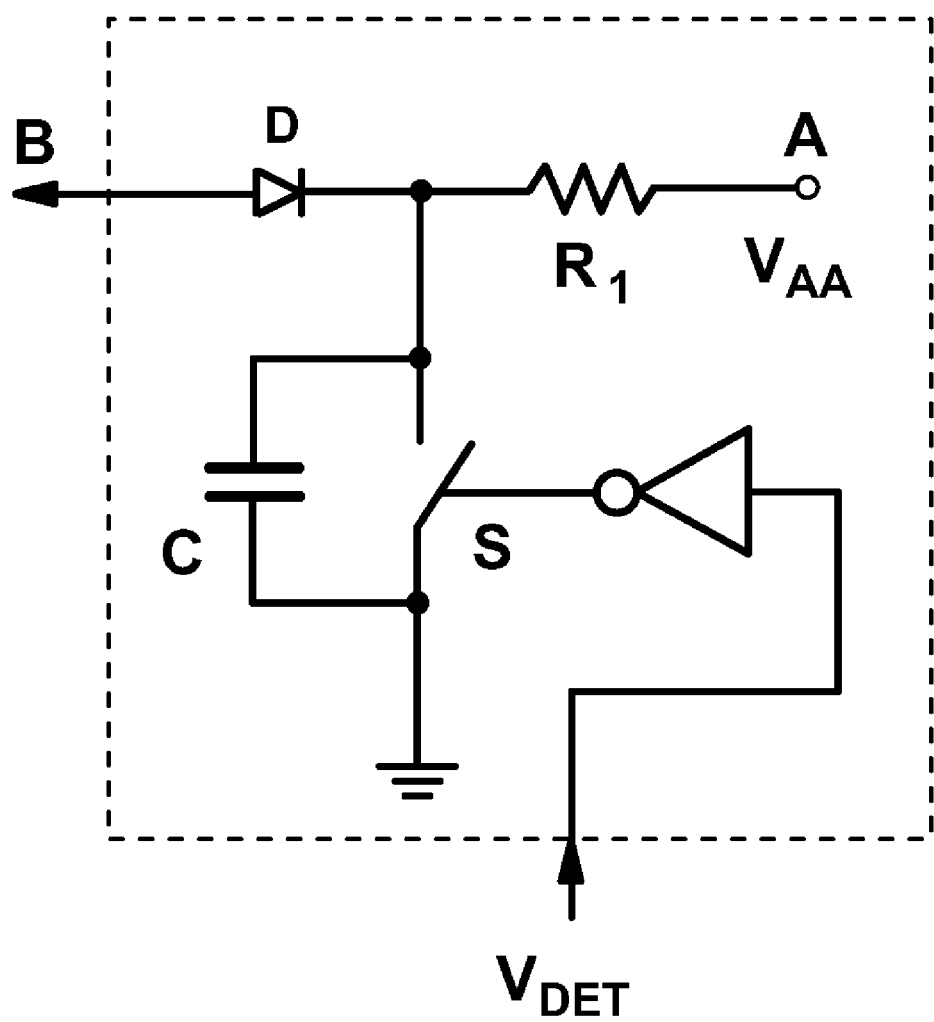
FIG. 15 shows example of duty-cycle reset method that can be employed in FIG. 14.
Figure 16:
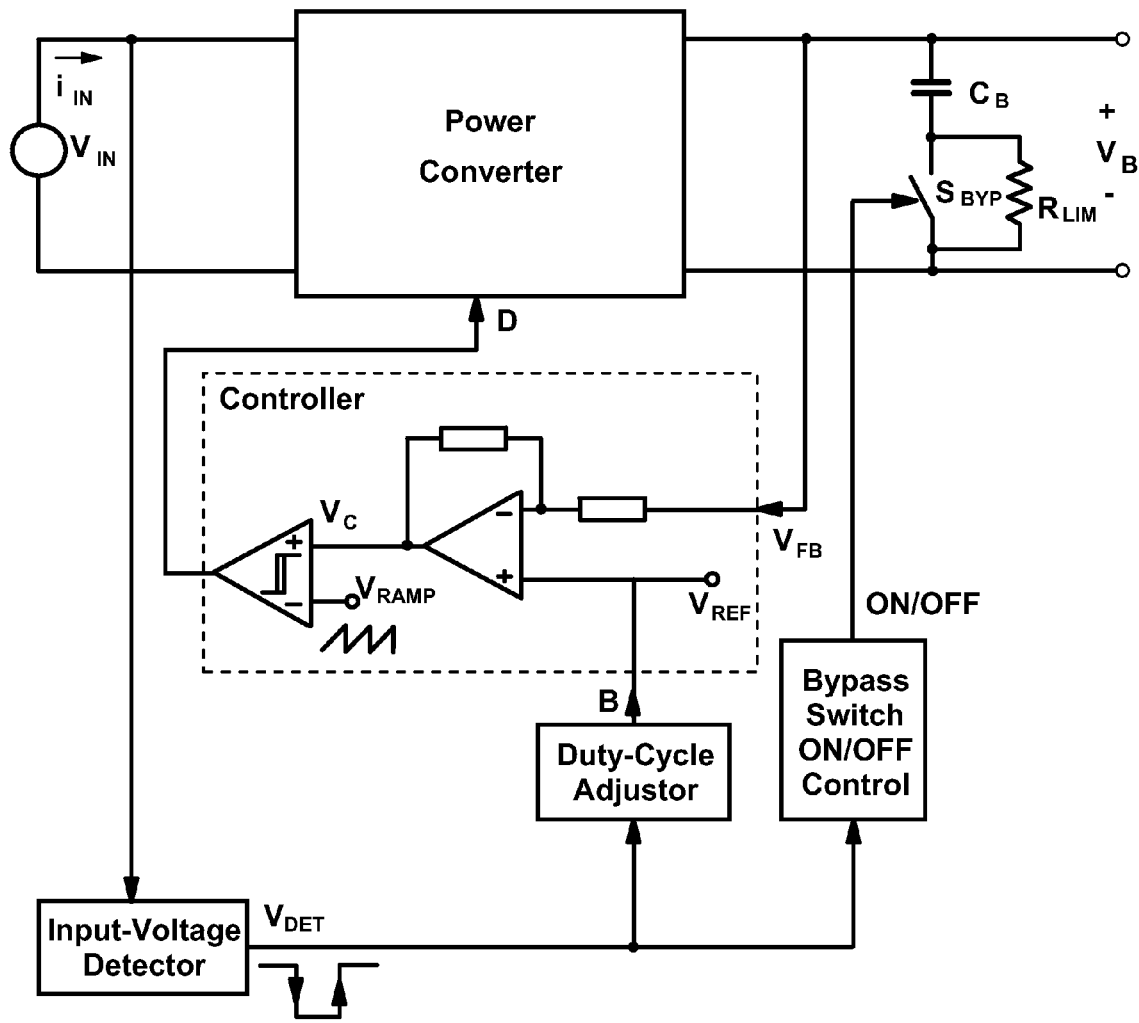
FIG. 16 shows modified implementation of method of this invention shown in FIG. 12.

It should be noted that many other implementations of the duty-cycle reset are possible. For example, instead of inserting the duty-cycle reset circuit between the output of the error amplifier and the non-inverting input of the PWM modulator as shown in FIG. 11, it is also possible to couple the duty-cycle reset circuit directly to the input of the PWM modulator as shown in FIG. 14. FIG. 14 shows the pulse width modulator having an input coupled to outputs of the duty cycle adjuster and error amplifier for adjusting the duty cycle. This implementation requires that the duty cycle-reset circuit shown in FIG. 13 to be modified so that input A is supplied from a properly selected constant voltage $V_{AA}$ and output B is decoupled from voltage $V_{AA}$ during normal operation by inserting a decoupling device such, for example, a diode rectifier in series with output B, as illustrated in FIG. 15. The same method of duty-cycle reset can be applied in the implementation that forces the reference voltage to a level required to adjust the duty cycle to zero, as shown in FIG. 16. The error amplifier of the controller shown in FIG. 16 has its inputs coupled to the energy storage device and the reference voltage. The reference voltage input is also coupled to the output of the duty cycle adjuster. The pulse width modulator has its input coupled to the output of the error amplifier for adjusting the duty cycle based on the output from the duty cycle adjustor.

Figure 17:
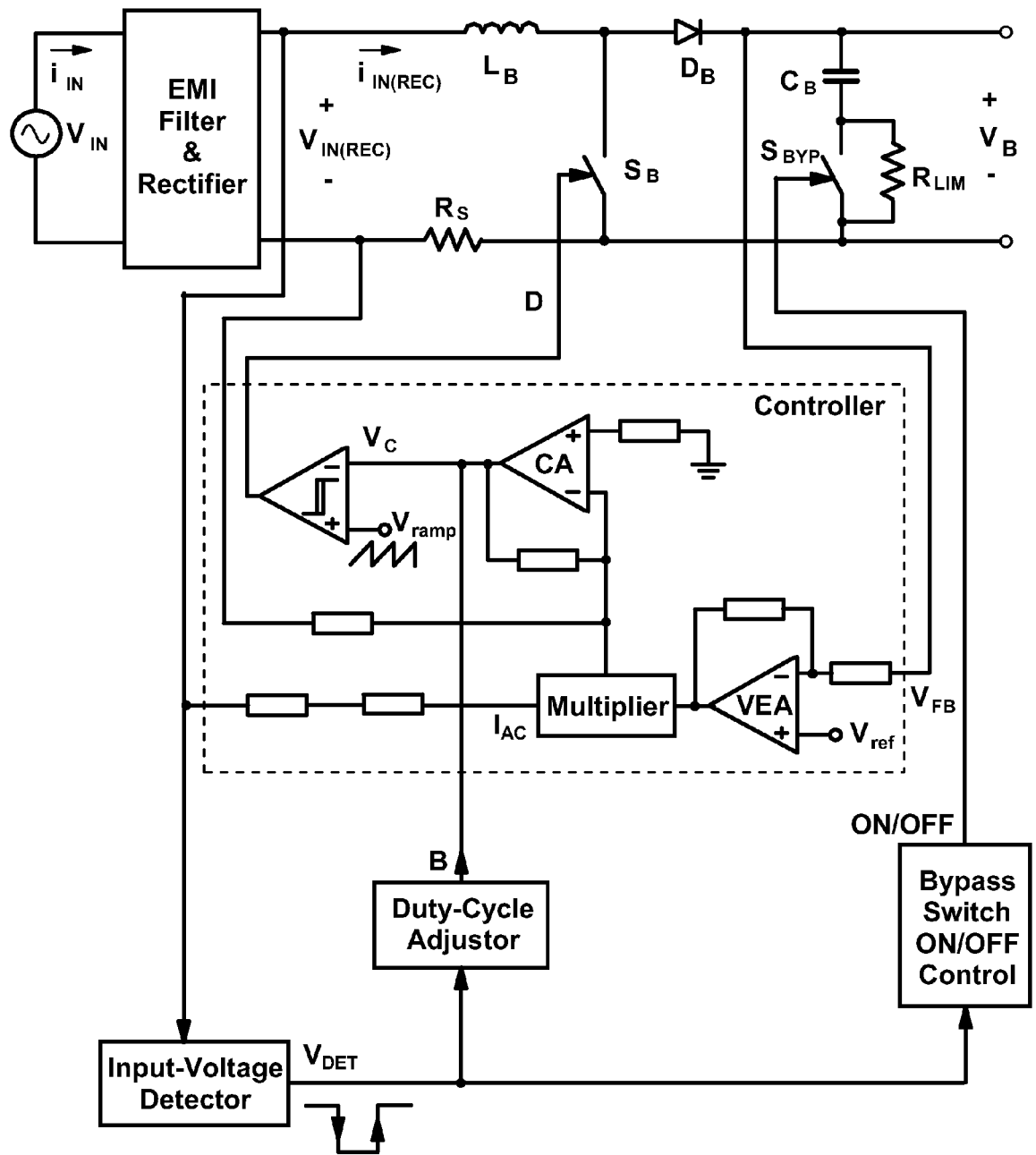
FIG. 17 shows example of embodiment of method of this invention in boost PFC front with analog controller implementation.
Figure 18:
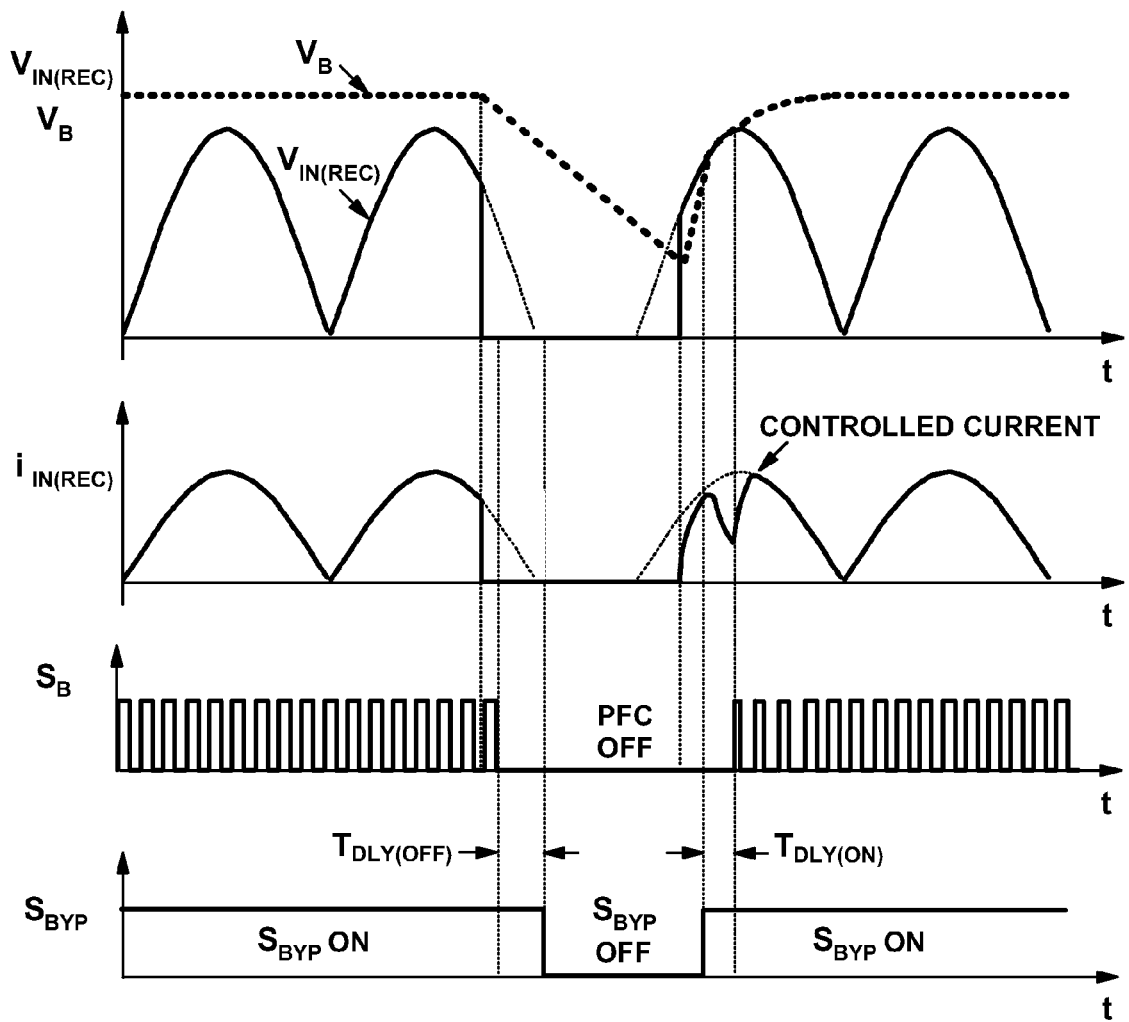
FIG. 18 shows key waveforms of the embodiment of method of this invention in FIG. 17.
Figure 19:
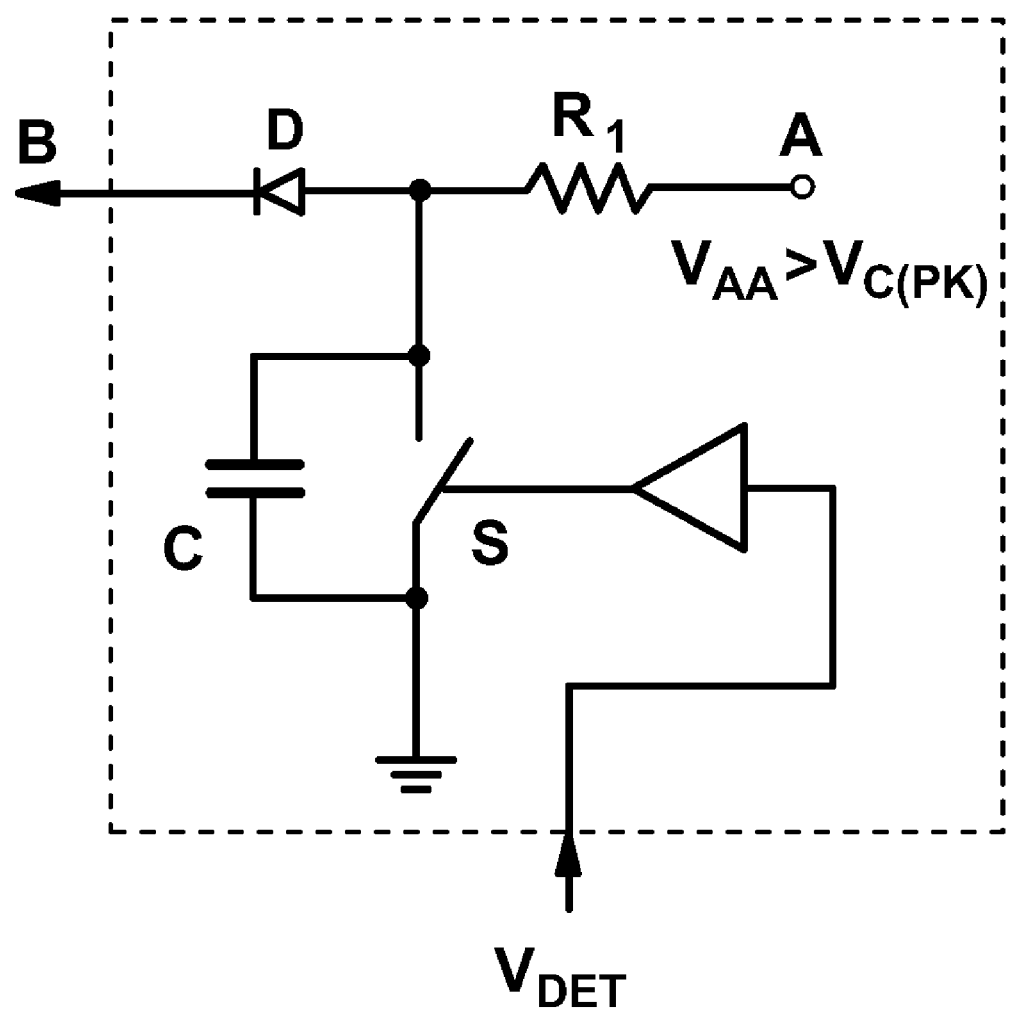
FIG. 19 shows example of duty-cycle reset method that can be employed in FIG. 17.

FIG. 17 shows the embodiment of the present invention in which the controller is coupled to the input voltage detector for increasing the level of detected voltage for adjusting the duty cycle of a boost PFC front end. The duty cycle of the PFC converter is reset by forcing control voltage $V_C$ at the PWM comparator input of the PFC controller to a desired level after input voltage loss detection. In the controller shown in FIG. 17, a typical controller employed in PFC applications, the control voltage $V_C$ is provided by a current amplifier CA and this voltage is coupled to the inverting input of the PWM. In order to reset, the duty cycle zero, the control voltage $V_C$ should be raised above the peak voltage of the saw-tooth ramp at the non-inverting output, i.e., above voltage $V_{C(PK)}$. Key waveforms of the embodiment in FIG. 17 are illustrated in FIG. 18. The duty-cycle reset implementation in FIG. 17 requires that the duty cycle-reset circuit shown in FIG. 15 to be modified so that input A is supplied from constant voltage $V_{AA}$ slightly greater than $V_{C(PK)}$ and that the decoupling diode rectifier is coupled in series with input B as shown in FIG. 19. This is done by increasing the input to the voltage detector by coupling it to the output of the controller, which employs a voltage multiplier.

Figure 20:
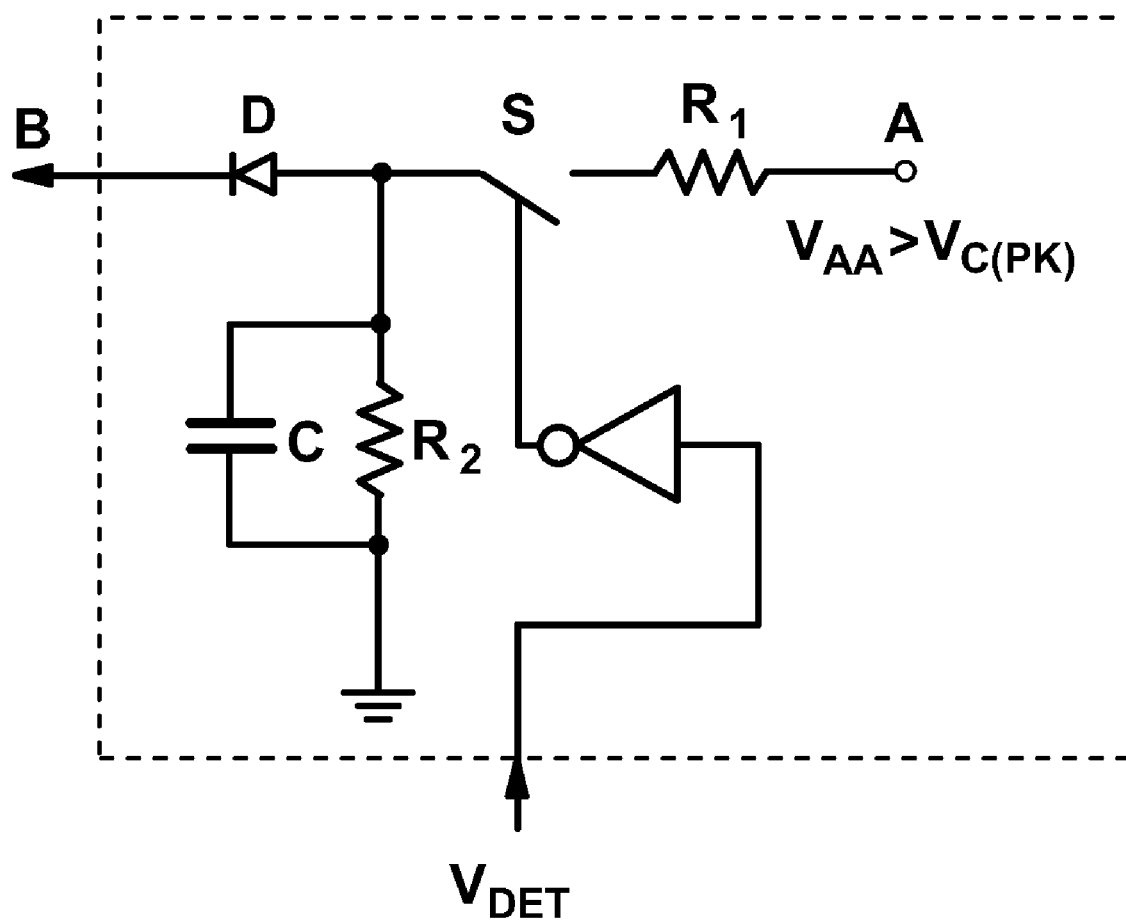
FIG. 20 shows yet another example of duty-cycle reset method that can be employed in FIG. 17.
Figure 21:
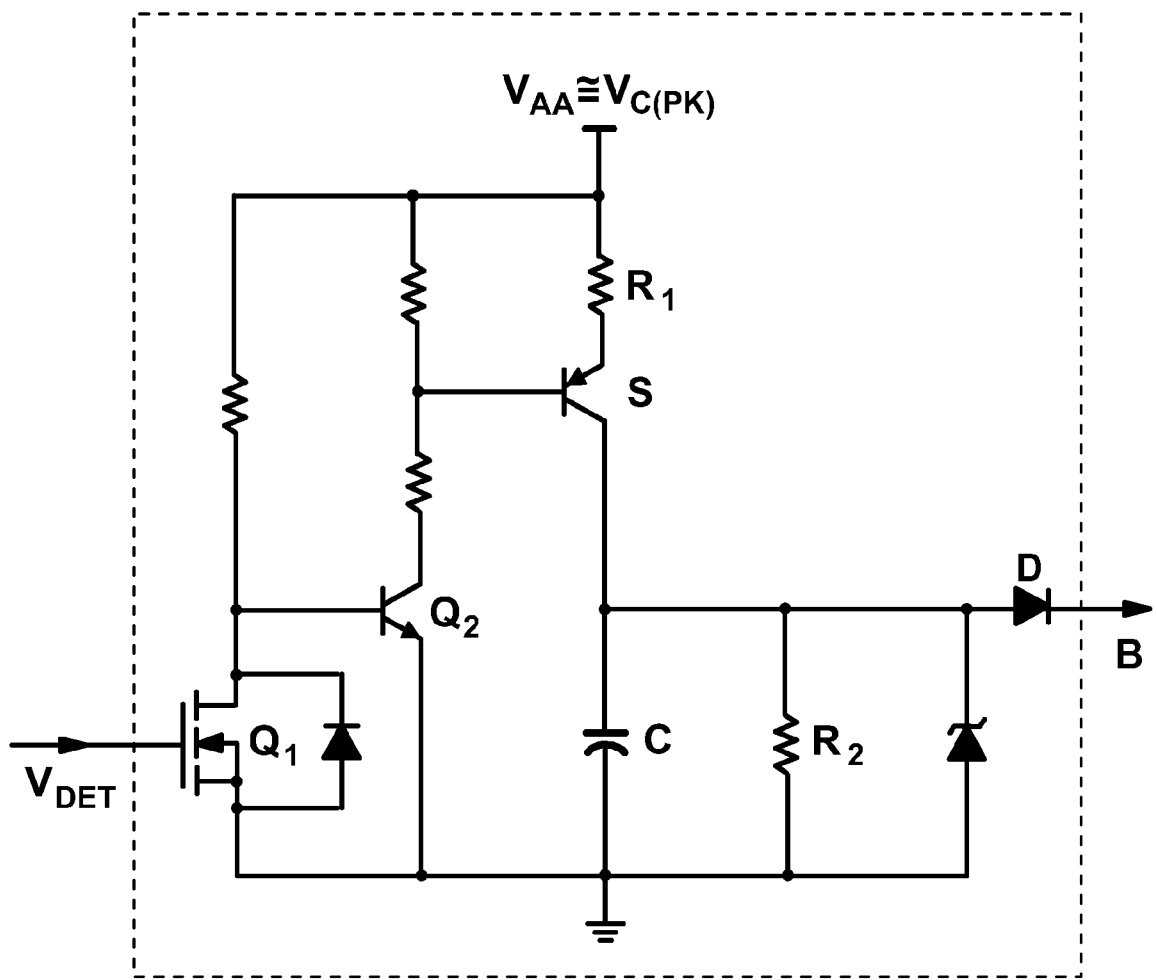
FIG. 21 shows example of circuit implementation of duty-cycle reset method in FIG. 20.
Figure 22:
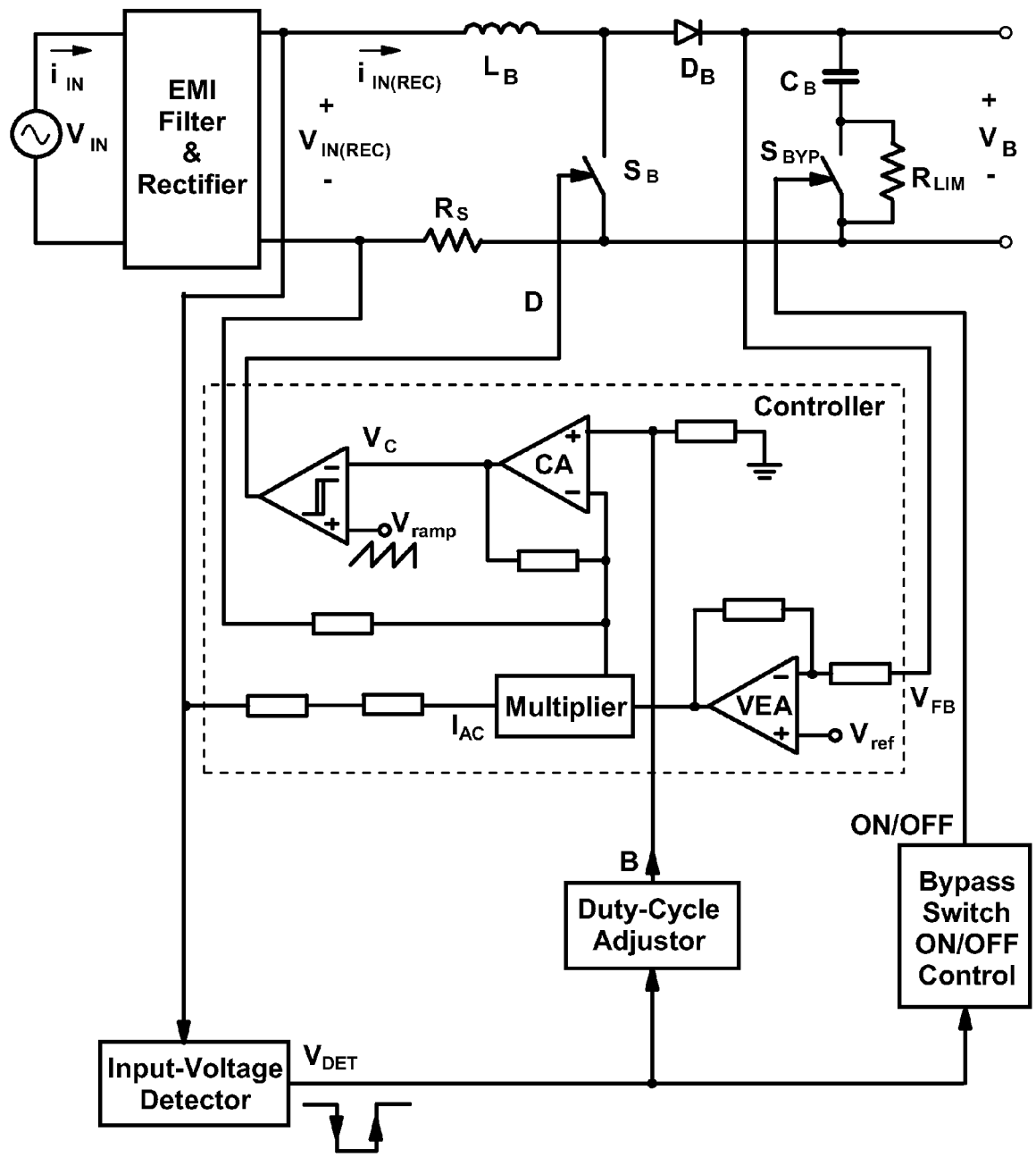
FIG. 22 shows another example of a circuit that implements the present invention.

FIG. 20 shows another implementation of the duty cycle reset circuit. The reset circuit has an energy storage device, i.e., capacitor C coupled and a switch S. In this implementation, switch S is coupled in series with capacitor C. During normal operation, i.e., when the initial voltage is present, switch S is turned off and output B of this duty-cycle reset circuit is decoupled from the controller by diode rectifier D since capacitor C is discharged. During an input voltage loss, switch S is turned on so that properly selected voltage $V_{AA}$ ($>V_{C(PK)}$) is applied to output B. After the initial voltage has recovered, switch S is turned off and the voltage at output B is slowly ramped down with a time constant determined by resistor $R_2$ and capacitance C. When the voltage decreases to the level that is required to maintain the loop regulation, rectifier D decouples the duty-cycle reset circuit from the controller. An example of the circuit implementation of the described duty-cycle reset method is shown in FIG. 21. FIG. 22 shows the embodiment of the present invention in the boost PFC front end front where the duty cycle reset of the PFC converter is done by forcing an input of current amplifier CA to an appropriate value.

Finally, the input-current-surge limiting method of this invention can also be employed in applications that use digital control and power management. In that case, the method of this invention is implemented in software as shown in flow charts in FIGS. 23 and 24. The flow chart in FIG. 23 show the software implementation for the case the power converter is disabled first and then the duty cycle of the controller is reset, whereas FIG. 24 shows flow chart of a software implementation where the power converter is disabled after input-voltage loss by setting the duty cycle to zero after the loss is detected.

Figure 23:
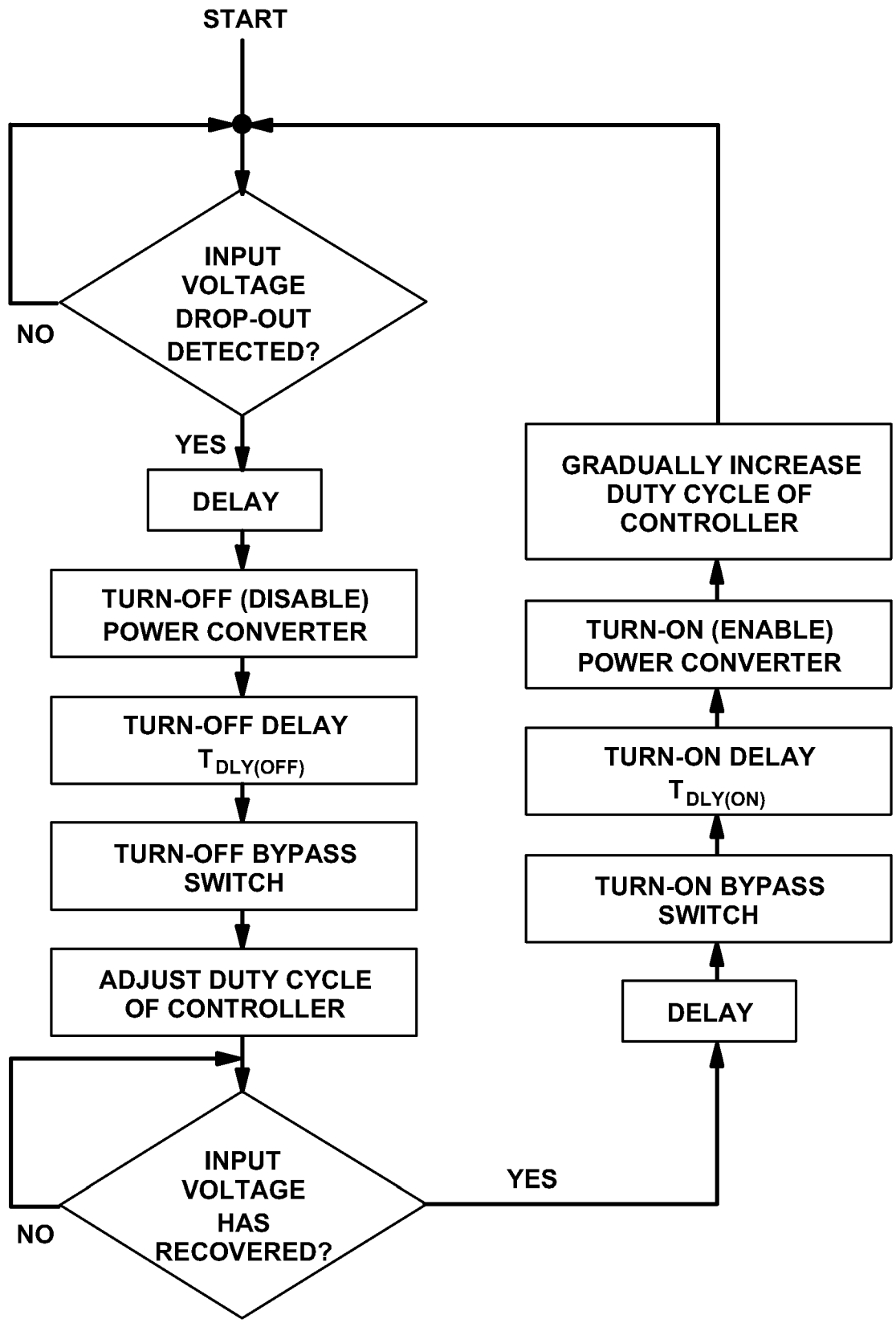
FIG. 23 shows flow chart of software embodiment of the method of this invention.
Figure 24:
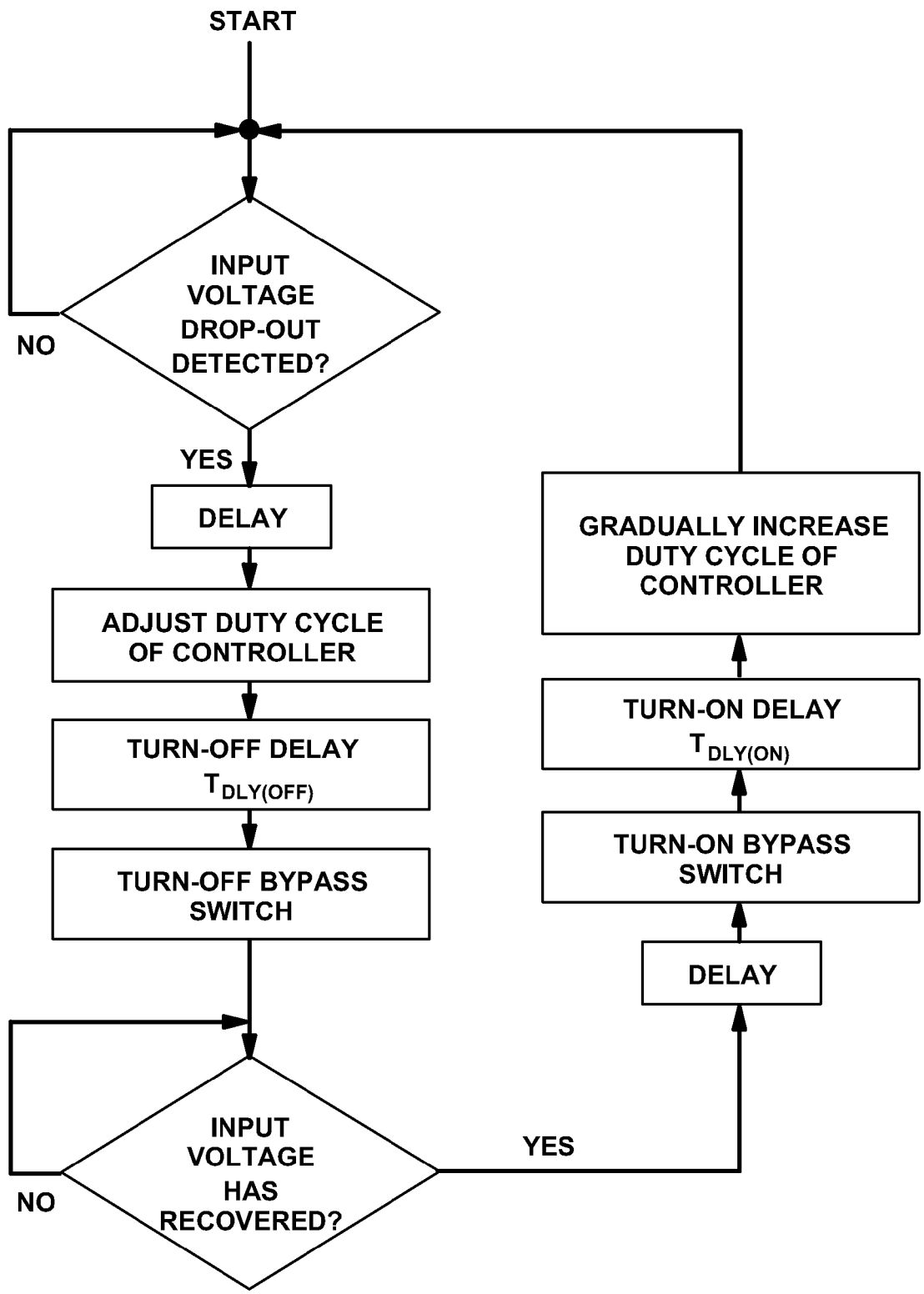
FIG. 24 shows another example of software implementation of embodiment of the method of this invention.

FIG. 23 show the software implementation for the case the power converter is disabled first and then the duty cycle of the controller is adjusted. FIG. 23 begins with determining if an input voltage drops from an initial voltage to a voltage below a threshold that corresponds to an input voltage loss. Once an input voltage drop is detected, the power converter is turned off or disabled after a short delay. After the power converter is turned off or disabled, there is another delay before bypass switch is actuated to the off position to limit that current through the energy device after the input voltage returns to its initial voltage. After the bypass switch is turned off, the duty cycle of the switching device is adjusted to zero or substantially zero. The process then waits for the input voltage to return to the initial voltage. Once the input voltage returns to the initial voltage, the bypass switch is turned on to bypass the current limiting resistor. After the bypass switch is turned on, the process has another delay before turning on or enabling the power converter. After the power converter is turned on or enabled, the duty cycle of the switching device is gradually increased from substantially zero to a value that maintains a regulated output for the power supply. FIG. 24 shows flow chart of a software implementation where the power converter is disabled by setting the duty cycle to zero after the input voltage loss is detected but before actuating the bypass switch.

It should be noted that the surge-current-limiting method of this invention is not limited only to topologies and implementations described in this patent application, but it is applicable to any power converter topology and can be implemented in a number of ways. Specifically, ac/dc application, this method is not limited to boost PFC topologies, but can be applied to any PFC topology such, for example, sepic topology. In addition, the surge-current-limiting method of this invention, can be applied in conjunction with any inrush-current method, already known or yet to be discovered, used to limit the input inrush current during input (line) voltage disturbances.

The invention claimed is:

1. A power supply powered by an initial supply voltage that normally operates the power supply, comprising:
    an input voltage detector that detects a drop in an input voltage from the initial supply voltage to a voltage below a threshold, wherein said drop in the input voltage corresponds to an input voltage loss that disturbs normal operation of the power supply and return of the input voltage corresponds to return to the normal operation of the power supply;
    a power converter coupled to the input voltage detector, said power converter having a switching device that is actuated in accordance with a duty cycle; and
    a duty cycle adjuster that gradually increases the duty cycle of the switching device from a substantially zero value to a value that maintains a regulated output for the power supply after return of the input voltage, wherein the gradual increase of the duty cycle limits an input current surge through the switching device.

2. The power supply of claim 1, further comprising:
    an energy storage device coupled to the power converter,
    a current limiting resistor that limits current through the energy storage device; and
    a bypass switch across the current limiting resistor that is actuated in response to the detection of the drop in input voltage to limit the current through the energy storage device after the input voltage returns.

3. The power supply of claim 2, wherein the power converter is turned off when the input voltage loss is detected, the bypass switch being actuated after turning off the power converter to limit the current through the energy storage device after the input voltage returns.

4. The power supply of claim 3, wherein after the input voltage returns, the bypass switch is actuated to bypass the current limiting resistor before turning on the power converter.

5. The power supply of claim 3, wherein the duty cycle adjuster is operated to turn off the power converter.

6. The power supply of claim 1, wherein said duty cycle adjuster comprises a reset circuit that resets the duty cycle to a substantially zero value from a value that ranges from substantially zero to substantially one.

7. The power supply of claim 6, wherein said reset circuit, comprises:
    a capacitor;
    a resistor; and
    a bypass switch across the capacitor that is actuated in response to the detection of the drop in input voltage.

8. The power supply of claim 7, wherein said capacitor and resistor set a time constant for gradually increasing the duty cycle after the duty cycle is reset.

9. The power supply of claim 6, wherein said reset circuit further comprises a diode.

10. The power supply of claim 1, further comprising a controller coupled to the duty cycle adjuster for controlling the duty cycle based on a voltage variation across the energy storage device for regulating the output of the power supply.

11. The power supply of claim 10, wherein said controller comprises:
    an error amplifier coupled to the storage device; and
    a pulse width modulator coupled to the error amplifier via the duty cycle adjustor for adjusting the duty cycle based on a reference voltage.

12. The power supply of claim 11, wherein said reference voltage is coupled to the error amplifier via the duty cycle adjuster.

13. The power supply of claim 11, wherein said pulse width modulator has an input coupled to outputs of the duty cycle adjustor and the error amplifier for adjusting the duty cycle.

14. The power supply of claim 11, wherein said error amplifier has an input coupled to the reference voltage and an output of the duty cycle adjuster.

15. The power supply of claim 1, wherein the power converter comprises at least one of a boost converter or a power factor correction converter.

16. The power supply of claim 1, wherein said input voltage comprises at least one of an AC voltage or DC voltage.

17. A method executed in a power supply device powered by an initial supply voltage that normally operates the power supply, comprising:
    detecting a drop in an input voltage from an initial supply voltage to a voltage below a threshold, wherein said drop in the input voltage corresponds to an input voltage loss that disturbs normal operation of the power supply and return of the input voltage corresponds to return to the normal operation of the power supply; and
    gradually increasing a duty cycle of a switching device of a power converter from a substantially zero value to a value that maintains a regulated output for the power supply after return of the input voltage, wherein the gradual increase of the duty cycle limits an input current surge through the switching device.

18. The method of claim 17, wherein said gradually increasing a duty cycle comprises:
    resetting the duty cycle of the switching device to a substantially zero value upon detecting the drop in the input voltage.

19. The method of claim 17, further comprising turning off the power converter when an input voltage loss is detected and then actuating a switch that limits the input current of the power supply after the input voltage returns.

20. The method of claim 17, wherein after the input voltage returns, a bypass switch is actuated to bypass the current limiting resistor before turning on the power converter.

* * * * *